(12) United States Patent
Kondo et al.

(10) Patent No.: US 7,379,120 B2
(45) Date of Patent: May 27, 2008

(54) IMAGE PROCESSING DEVICE AND IMAGE PROCESSING METHOD

(75) Inventors: Makoto Kondo, Kanagawa (JP); Kazuhiko Nishibori, Kanagawa (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 11/130,530

(22) Filed: May 17, 2005

(65) Prior Publication Data
US 2005/0270418 A1 Dec. 8, 2005

(30) Foreign Application Priority Data
May 18, 2004 (JP) ............................. 2004-148077

(51) Int. Cl.
*H04N 7/01* (2006.01)
(52) U.S. Cl. .................................... 348/448
(58) Field of Classification Search ............... 348/448, 348/441, 449, 451, 452, 459, 458, 700, 701; 375/240.01
See application file for complete search history.

(56) References Cited

U.S. PATENT DOCUMENTS

| | | | |
|---|---|---|---|
| 5,936,676 A | | 8/1999 | Ledinh et al. |
| 6,118,488 A | * | 9/2000 | Huang .................... 348/452 |
| 6,262,773 B1 | * | 7/2001 | Westerman ............... 348/448 |
| 6,408,024 B1 | * | 6/2002 | Nagao et al. ........... 375/240.01 |
| 6,417,887 B1 | * | 7/2002 | Yamaji .................... 348/452 |
| 6,483,545 B1 | * | 11/2002 | Kondo et al. ............ 348/448 |
| 6,496,598 B1 | * | 12/2002 | Harman .................. 382/154 |
| 6,985,187 B2 | * | 1/2006 | Han et al. ................ 348/452 |
| 6,999,128 B2 | * | 2/2006 | Kasahara et al. ........... 348/452 |
| 2004/0233328 A1 | * | 11/2004 | Tsao et al. ............... 348/452 |

FOREIGN PATENT DOCUMENTS

| | | |
|---|---|---|
| EP | 0 860 992 | 8/1998 |
| JP | 8 275116 | 10/1996 |
| JP | 2001 169252 | 6/2001 |
| JP | 2002 232851 | 8/2002 |
| JP | 2003 116109 | 4/2003 |
| JP | 2003 339027 | 11/2003 |

* cited by examiner

*Primary Examiner*—Paulos M. Natnael
(74) *Attorney, Agent, or Firm*—Frommer Lawrence & Haug LLP; William S. Frommer; Paul A. Levy

(57) ABSTRACT

To provide an image processing device able to generate a progressive image signal in high quality based on an interlaced image signal and an image processing method for the same, wherein a continuity detection circuit detects continuities in the interlaced image signal and to the field image signal, a moving circuit moves one of the field image signals before and behind one field based on a motion vector between the field image signals before and behind one field to generate a first field image signal, and an image signal generation circuit decides a mixture ratio based on the continuity and mixes the first field image signal and a second field image signal based on a line in the field image signal at the mixture ratio to generate a third field image signal included in the progressive signal.

10 Claims, 12 Drawing Sheets

A CASE OF CONTINUITY MOTION VECTOR 2-2 PULL-DOWN FILM VIDEO 3-2 PULL-DOWN FILM VIDEO

CONVERTED IMAGE

A CASE OF DISCONTINUITY MOTION VECTOR

PIXEL P OBTAINED BY
INTERPOLATION IN FIELD

INTRA-FIELD INTERPOLATION METHOD
(1) LINEALY INTERPOLATION METHOD
(2) OBLIQUE INTERPOLATION METHOD

OBLIQUE INTERPOLATION METHOD

IMAGE PROCESSING DEVICE AND IMAGE PROCESSING METHOD

CROSS REFERENCES TO RELATED APPLICATIONS

The present invention contains subject matter related to Japanese Patent Application JP 2004-148077 filed in the Japanese Patent Office on May 18, 2004, the entire contents of which being incorporated herein by reference.

BACKGROUND OF THE INVENTION

1. Field of the Invention

The present invention relates to an image processing device for converting an interlaced image signal included in a moving image signal to a progressive image signal, and to an image processing method used for the same.

2. Description of the Related Art

An image signal for television broadcasting and an image signal recoded on a video cassette, a digital versatile disc (DVD) or other recoding media are an interlaced image signal in which an odd field image and even field image are arranged alternately.

On the other hand, a liquid crystal display, a plasma display panel or other flat panel displays is used with a progressive image signal scanning continuously.

There has been an image processing device for converting the interlaced image signal to the progressive image signal in related art.

The image processing device in related art interpolates a line not existing in the field image signal to generate a frame image signal included in the progressive image signal based on a line in a field image signal included in the interlaced image signal.

For example, an example of the image processing device in related art has been mentioned in Japanese Unexamined Patent Publication (Kokai) No. 2003-179884.

SUMMARY OF THE INVENTION

However, the image processing device in related art may have a disadvantage that quality of the progressive image signal tends to lower.

The present invention is to provide an image processing device able to generate the progressive image signal in high quality based on the interlaced image signal, and an image processing method for the same.

According to an embodiment of the present invention, there is provided an image processing device converting an interlaced image signal included in a moving image signal to a progressive image signal, the image processing device having: a continuity detection circuit detecting continuities of a field image signal to be processed in the interlaced image signal and field image signals before and behind one field to the field image signal to be processed based on these three field image signals; a moving circuit moving at least one of the field image signals before and behind one field for one field period's worth based on a motion vector between the field image signals before and behind one field to generate a first field image signal included in a line not existing in the field image signal to be processed; and an image signal generation circuit deciding a mixture ratio based on the continuity detected by the continuity detection circuit, and mixing the first field image signal generated by the moving circuit and a second field image signal obtained by interpolating the line not existing in the field image signal to be processed based on a line in the field image signal to be processed at the mixture ratio to generate a third field image signal included in the progressive signal.

According to an embodiment of the present invention, there is provided an image processing method converting an interlaced image signal included in a moving image signal to a progressive image signal, the image processing method having: a first step of detecting continuity of a field image signal to be processed in the interlaced image signal and field image signals before and behind one field to the field image signal based on these three field image signals; a second step of moving at least one of the field image signals before and behind one field for one field period's worth to generate a first field image signal including a line not existing in the field image signal to be processed based on a motion vector between the field image signals before and behind one field; a third step of deciding a mixture ratio based on the continuity detected in the first step; and a fourth step of mixing the first field image signal generated in the second step and the second field image signal obtained by interpolating the line not existing in the field image signal to be processed based on a line in the field image signal to be processed at the mixture ratio decided in the third step to generate a third field image signal included in the progressive signal.

An embodiment of the present invention is able to provide an image processing device able to generate the progressive image signal in high quality based on the interlaced image signal, and an image processing method for the same.

BRIEF DESCRIPTION OF THE DRAWINGS

These features of embodiments of the present invention will be described in more detail with reference to the accompanying drawings, in which.

DESCRIPTION OF THE PREFERRED EMBODIMENTS

Related Art of the Present Embodiment

Figure 1:
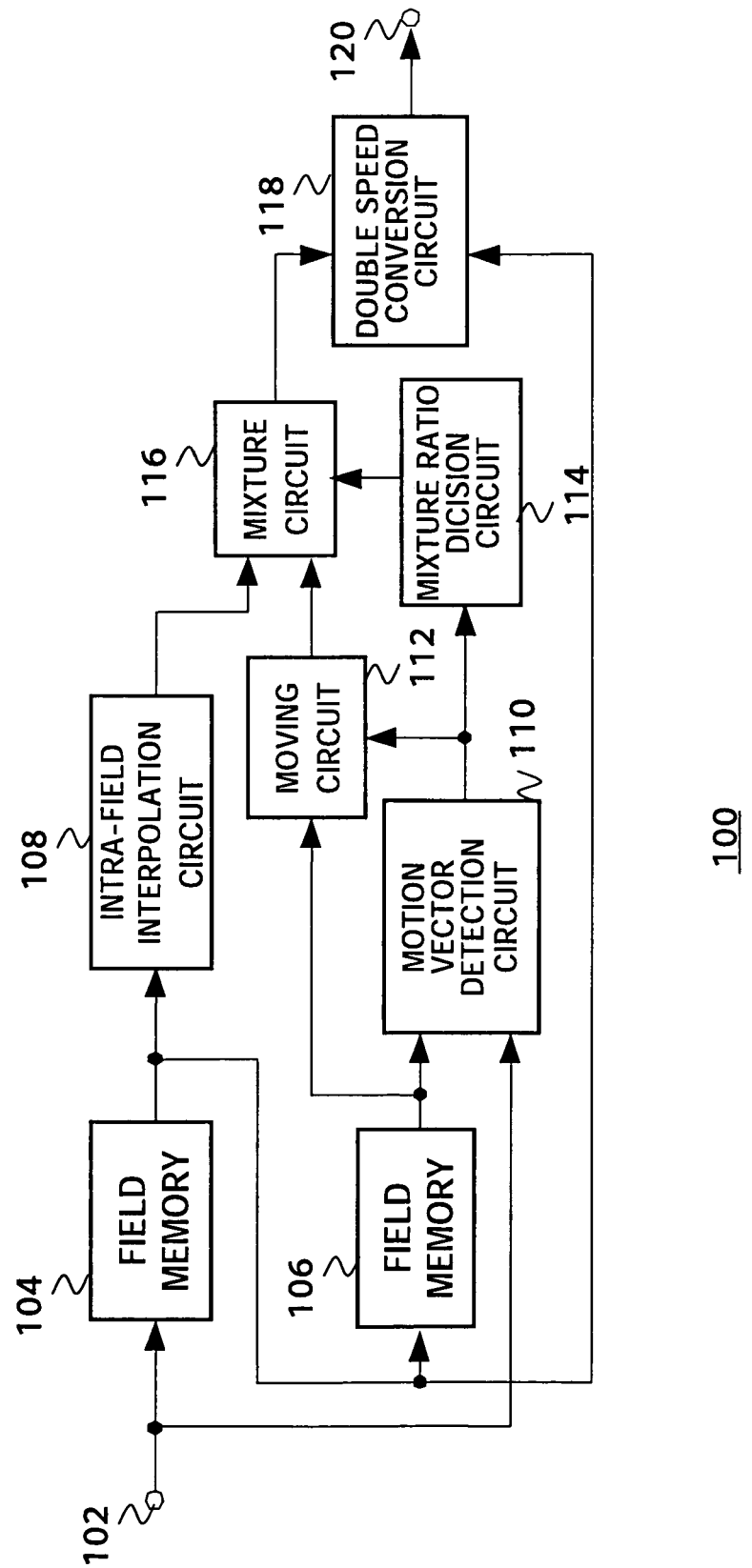
FIG. 1 is a view of a configuration of an image processing circuit according to related art of the present embodiment.

FIG. 1 is a view of a configuration of an image processing device 100 according to related art of the present embodiment.

The image processing circuit 100 is set to a circuit converting an interlaced signal to a progressive signal.

As shown in FIG. 1, the image processing device 100 has an input terminal 102, a field memory 104, a field memory 106, an intra-field interpolation circuit 108, a motion vector detection circuit 110, a moving circuit 112, a mixture ratio decision circuit 114, a mixture circuit 116, a double speed conversion circuit 118 and an output terminal 120.

In the image processing circuit 100 shown in FIG. 1, a field image signal $F_t$ which is input from the input terminal 102 is output to the field memory 104 and the motion vector detection circuit 110.

The field memory 104 delays the input field image signal $F_t$ for one field period's (cycle) worth and outputs it to the intra-field interpolation circuit 108 and the field memory 106.

Hereinafter, a field image signal before one field to the field image signal $F_t$ is indicated as a "field image signal $F_{t-1}$".

The intra-field interpolation circuit 108 generates a field image signal $F'_{t-1}$ interpolated a pixel in the line not existing in the input field image signal $F_{t-1}$ (hereinafter, refer to an "interpolation line") by using a pixel in an existing line, and outputs the generated signal to the mixture circuit 116.

The intra-field interpolation circuit 108 generates the field image signal $F'_{t-1}$, for example, by using an average of the upward and downward lines that an interpolation line of the field image signal $F_{t-1}$ is sandwiched.

The field memory 106 delays the input field image signal $F_{t-1}$ for one field period's worth and outputs it to the motion vector detection circuit 110 and the moving circuit 112.

Hereinafter, a field image signal before two fields to the field image signal $F_t$ is indicated as a "field image signal $F_{t-2}$".

The motion vector detection circuit 110 calculates a motion vector of a body in a display between the input field image signals $F_t$ and $F_{t-2}$ which have the intervals for the input two field period's worth by a block matching method.

Then, the motion vector detection circuit 110 outputs the calculated motion vector between the frames and a block differential value indicating reliability of the motion vector to the moving circuit 112.

The motion vector detection circuit 110 outputs the block differential value to the mixture ratio decision circuit 114.

The moving circuit 112 makes the field image signal $F_{t-2}$ which is input from the field memory 106 move in parallel for a half of the motion vector which is input from the motion vector detection circuit 110, namely, for a motion vector corresponding to one field period's worth, and outputs the parallel-moved signal to the mixture circuit 116.

The mixture ratio decision circuit 114 decides a mixture ratio of a pixel for the field image signal $F'_{t-1}$ interpolated by the mixture circuit 116 and the parallel-moved field image signal $F_{t-2}$ which are placed in the same coordinate in every block unit based on the block differential value indicating the reliability of the motion vector which is input from the motion vector detection circuit 110, and outputs the mixture ratio to the mixture circuit 116.

The block differential value indicates the minimum block differential value between the field image signals $F_t$ and $F_{t-2}$ which are used for detecting the motion vectors by the block matching method, for example.

The mixture ratio decision circuit 114 decides the mixture ratio so as to make a ratio mixing a pixel of the field image signal $F_{t-2}$ more than a ratio mixing a pixel of the field image signal $F'_{t-1}$, when it can be decided that the block differential is small and the reliability of the motion vector is high.

On the other hand, the mixture ratio decision circuit 114 decides the mixture ratio so as to make a ratio mixing the pixel of the field image signal $F_{t-2}$ less than a ratio mixing the pixel of the field image signal $F'_{t-1}$ when it can be decided that the block differential is large and the relativity of the motion vector is low.

The mixture circuit 116 mixes the pixels of the interpolated field image signal $F'_{t-1}$ and the parallel-moved field image signal $F_{t-2}$ which are placed in the same coordinate based on the mixture ratio which is input from the mixture ratio decision circuit 114 to generate the interpolation line corresponding to the field image signal $F_{t-1}$, and outputs it to the double speed conversion circuit 118.

The double speed conversion circuit 118 alternatively outputs the line in the field image signal $F_{t-1}$ which is output by the field memory 104 and the interpolation line corresponding to the field image signal $F_{t-1}$ which is input from the mixture circuit 116 at twice of a horizontal scan period when inputting them to generate a frame image signal (successively scan image signal) $H_{t-1}$, and outputs it to the output terminal 120.

Figure 2:
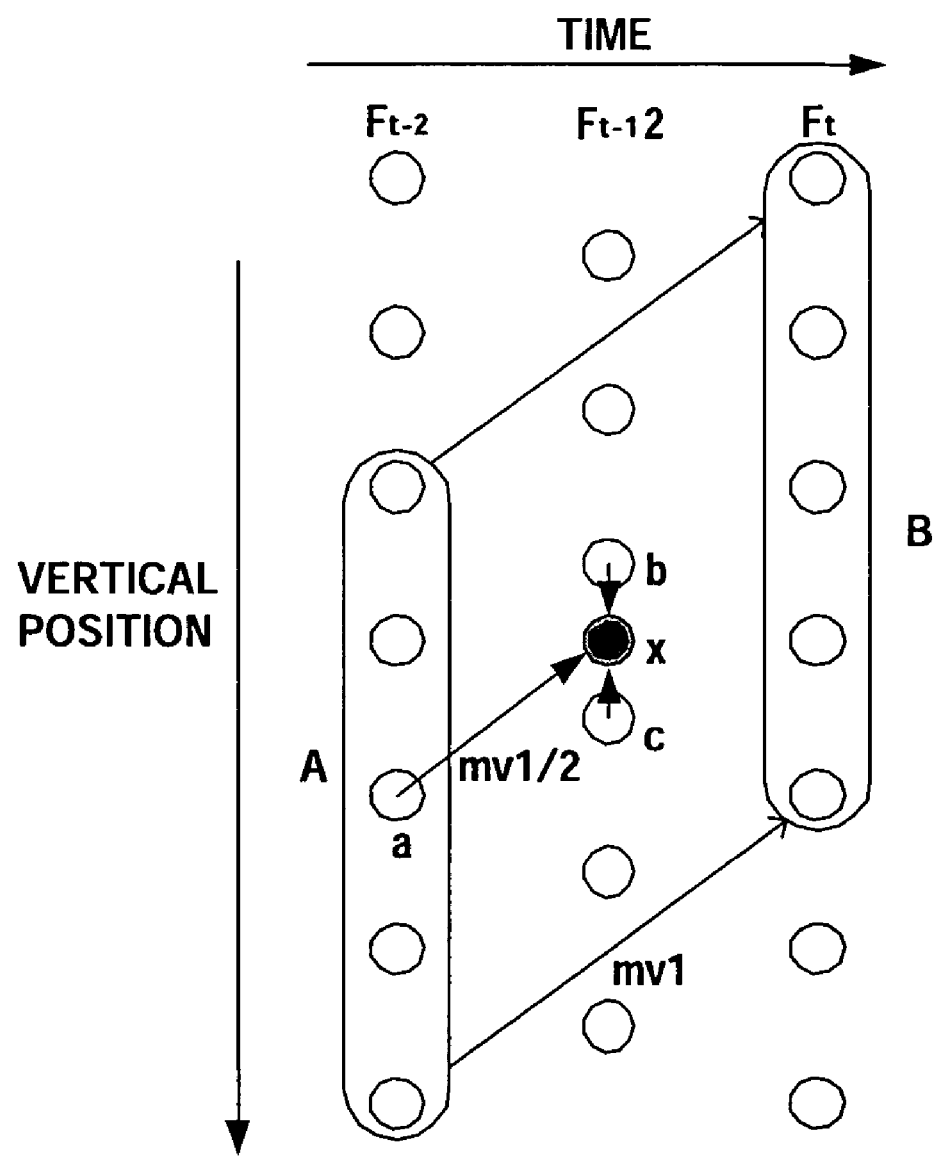
FIG. 2 is a view for illustrating the related art of the present embodiment.

FIG. 2 is a view showing a processing of the image processing circuit 100 shown in FIG. 1.

The image processing circuit 100 performs the interpolation based on the pixel data of the pixels b and c at upward and downward pixels of the pixel x to generate the pixel data of the pixel x in the field image signal $F_{t-1}$ in the intra-field interpolation circuit 108.

The motion vector detection circuit 110 generates a motion vector mv1 from a block A in the field image signal $F_{t-2}$ and a block B in the field image signal $F_t$.

The moving circuit 112 generates the pixel data of the pixel x based on the motion vector mv1/2 which is obtained from the motion vector mv1 and the pixel a in the field image signal $F_{t-2}$ corresponding to the pixel x.

Then, the mixture circuit 116 mixes the pixel data generated by the intra-field interpolation circuit 108 and the pixel data generated by the moving circuit 112 at the mixture ratio decided by the mixture ratio decision circuit 114 as mentioned above.

Figure 3:
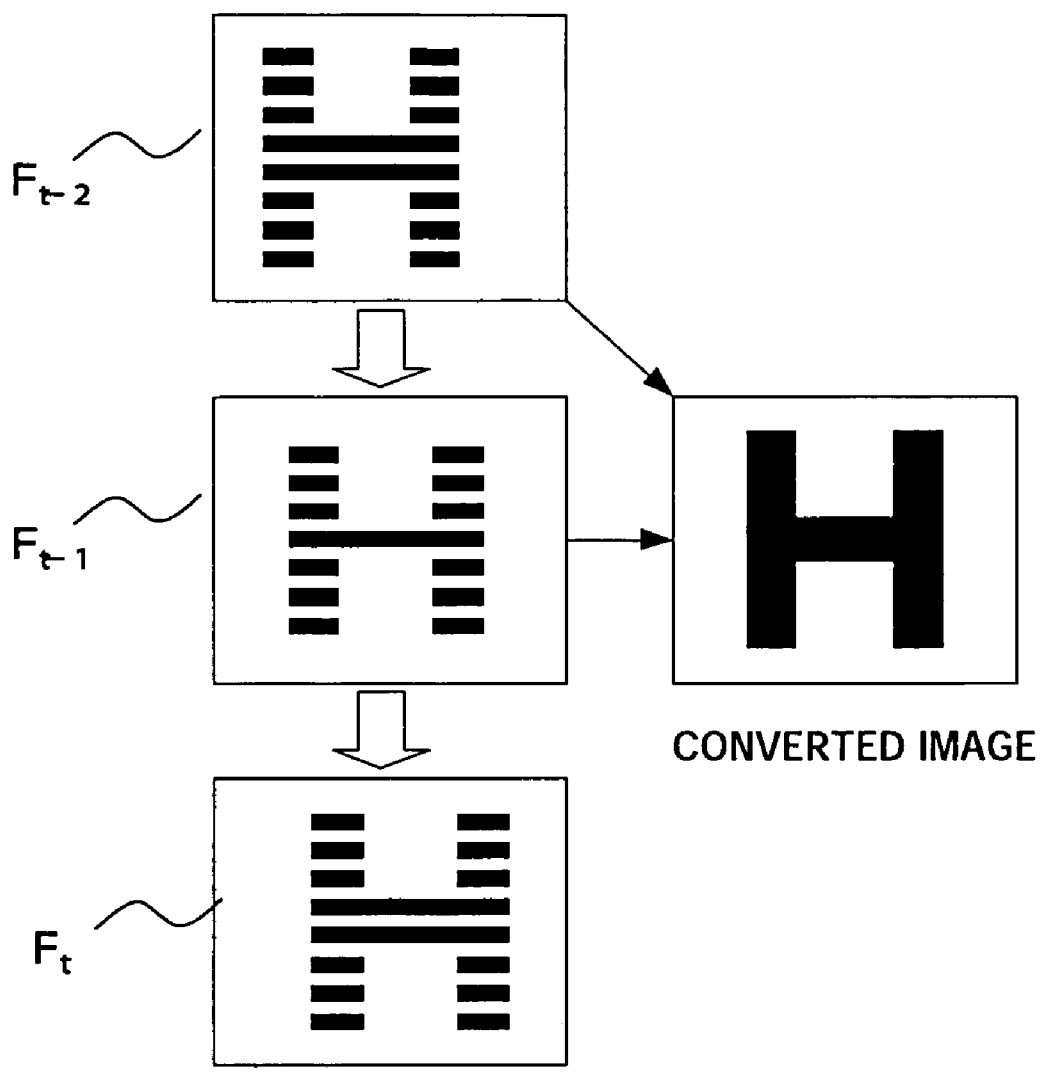
FIG. 3 is a view for illustrating the related art of the present embodiment.

The image processing circuit 100 shown in FIG. 1 is able to generate accurate interpolation pixel data with respect to a body which moves in parallel continuously by estimating a motion of the body and preparing the interpolation pixel data as shown in FIG. 3.

However, the method in related art has a disadvantage as the following. Obviously with referring to FIG. 2, since the motion vector obtained between the field image signals $F_{t-2}$ and $F_t$ is adopted to the interpolation of the field image signals $F_{t-2}$ and $F_{t-1}$, the accurate interpolation pixel may not be able to be obtained if the motion vector from the field image signals $F_{t-2}$ to $F_{t-1}$ and the motion vector from the field image signals $F_{t-1}$ to $F_t$ are different.

Figure 4A:
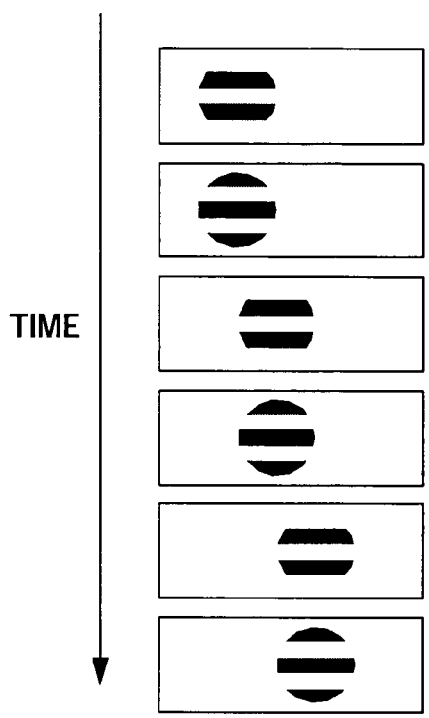
FIGS. 4A and 4B are views for illustrating the related art of the present embodiment.
Figure 4B:
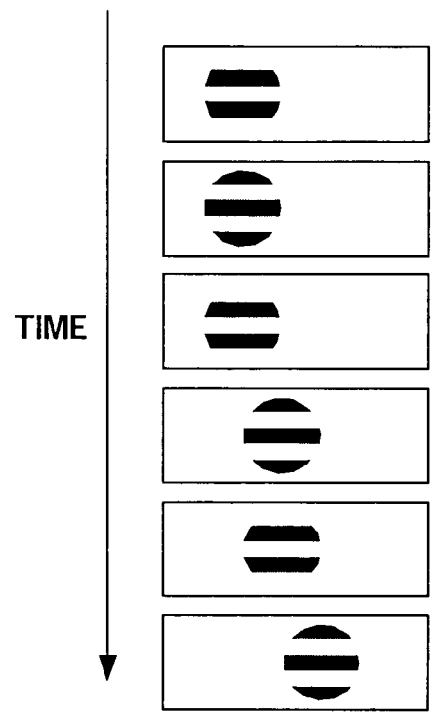

The field image signal used for movie and television commercial video (hereinafter, refer to a "film image signal") is performed with a 2-2 pull-down processing or a 3-2 pull-down processing as shown in FIGS. 4A and 4B, and is set to a signal displaying an image at the same time repeatedly in twice or third times. Such signal makes the motion of the image become discontinuity.

Along with a development of an image processing technology by a computer in recent year, broadcastings using a computer graphics image (hereinafter, refer to a "CG image") has been common. The CG image signal is a system of repeating a same image in several times and then sifting a next image, so that the motion of the image becomes discontinuity similar to the film image signal.

Figure 5:
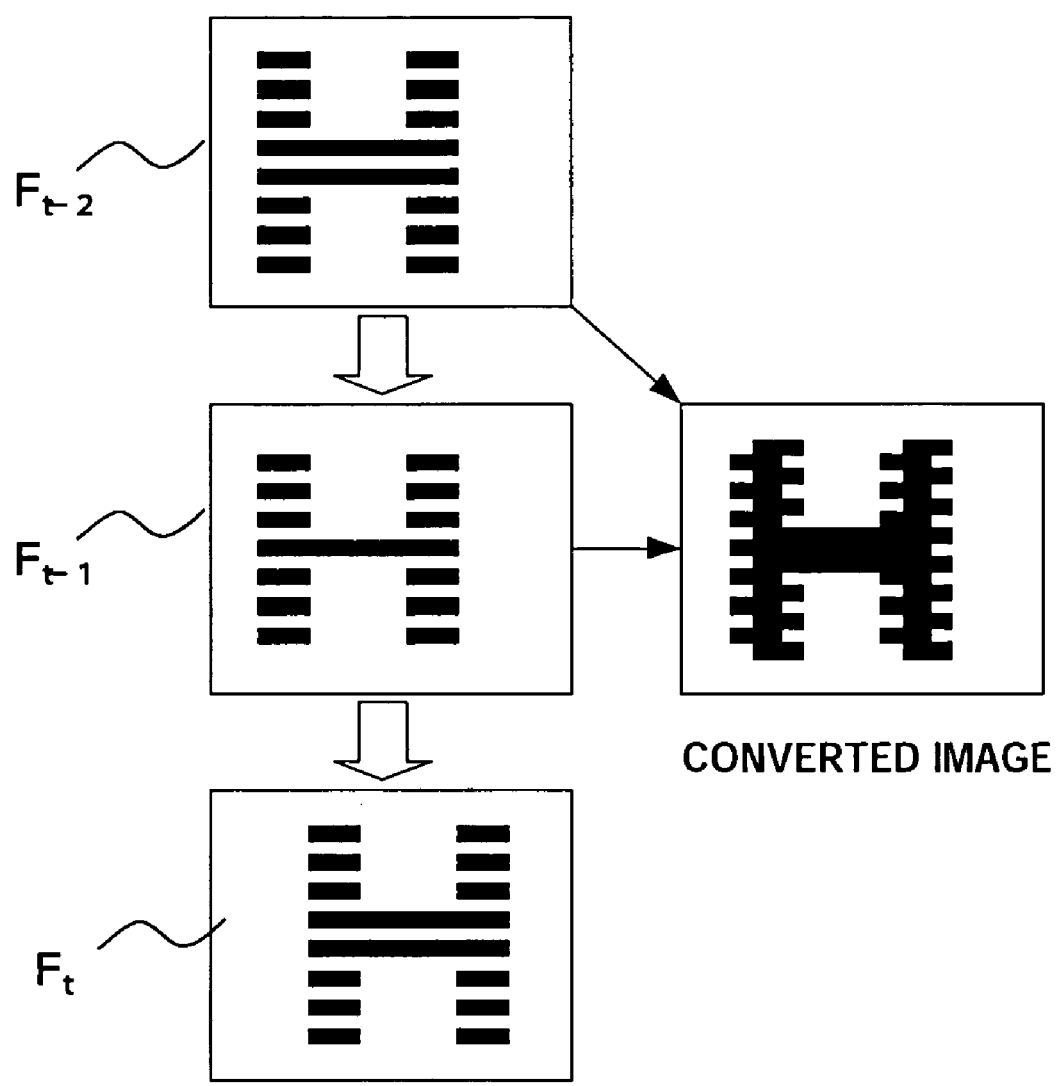
FIG. 5 is a view for illustrating the related art of the present embodiment.

The image processing circuit 100 shown in FIG. 1 assumes that a body moves continuity, and generates the interpolation image, so that the interpolation image and the original image are shifted and combined to generate an image as shown in FIG. 5 if performing a conversion processing with respect to the film image signal and the CG image signal. Consequently, there is a disadvantage that the image quality is lowered.

As a method against the disadvantage, it can be considered to detect whether it is a film image by using an interrelated pattern of the continuous field image signal and not to perform a motion correction with respect to the film image. However the method is not able to perform an accurate detection with respect to an image in which a film image and a general image, or a CG image and a general image are mixed. Further it is difficult to detect a film image with respect to an image having a lot of transfer noise, so that it causes the disadvantage shown in FIG. 5.

Next, an image processing circuit according to embodiments of the present invention will be described.

First Embodiment

Figure 6:
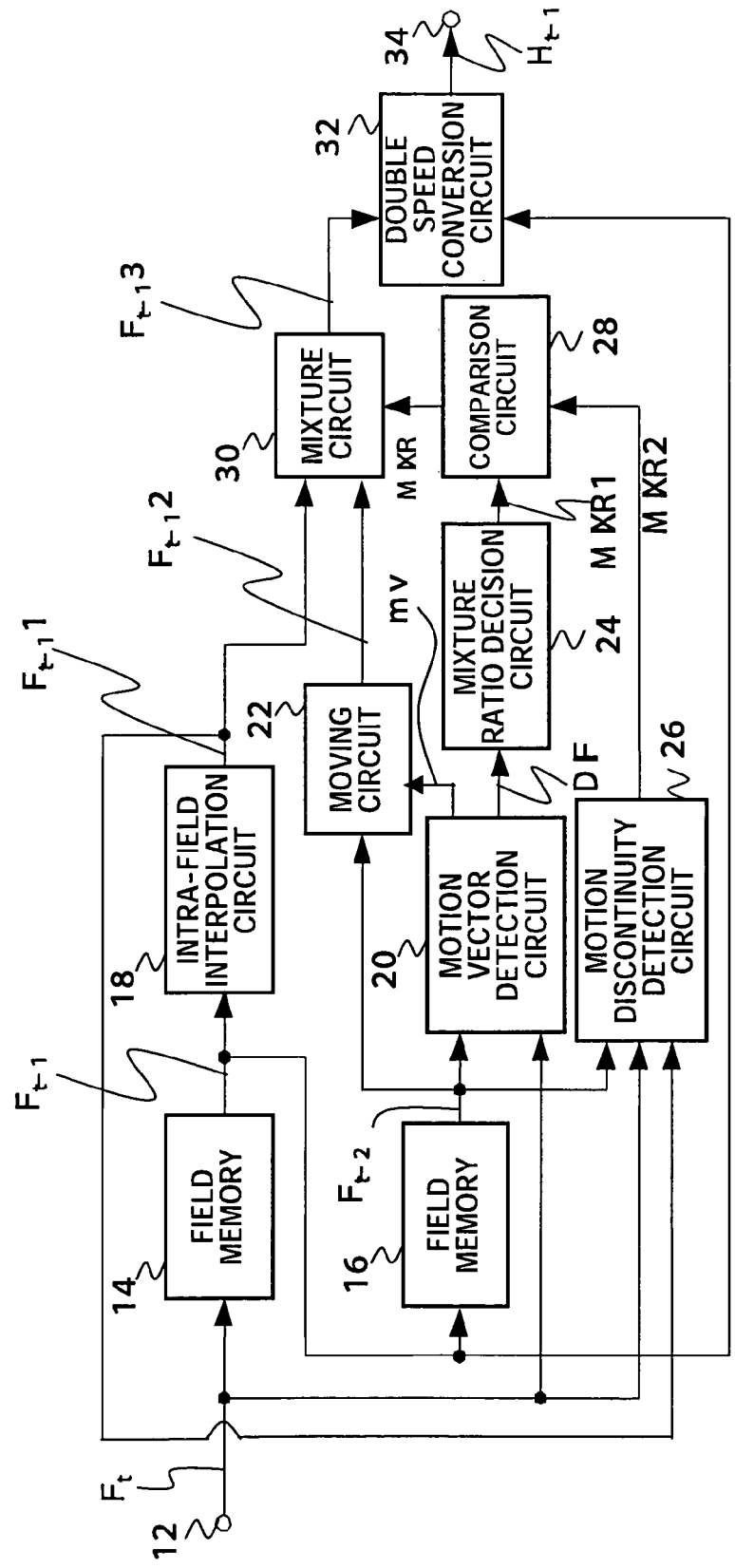
FIG. 6 is a view of a configuration of an image processing circuit according to a first embodiment of the present embodiment.

FIG. 6 is a view of a configuration of an image processing device 1 of a first embodiment of the present invention.

As shown in FIG. 6, the image processing device 1 has an input terminal 12, a field memory 14, a field memory 16, an intra-field interpolation circuit 18, a motion vector detection circuit 20, a moving circuit 22, a mixture ratio decision circuit 24, a motion discontinuity detection circuit 26, a comparison circuit 28, a mixture circuit 30, a double speed conversion circuit 32 and an output terminal 34, for example.

The image processing device 1 detects a continuity of the motion with respect to an interlaced video signal in the every pixel, and does not perform a motion correction at a region with a discontinuous motion. So the image processing device 1 generates a progressive video signal in high quality with respect to the film image, the CG image or the CG image superposed in the general image.

In the image processing device 1 shown in FIG. 6, a field image signal $F_t$ included in the interlaced image signal which is input from the input terminal 12 is output to the field memory 14 and the motion vector detection circuit 20.

(Field Memories 14 and 16)

The field memory 14 delays the field image signal $F_t$ which is input from the input terminal 12 for one field period's (cycle) worth, and outputs it to the intra-field interpolation circuit 18, the field memory 16 and the double speed conversion circuit 32.

Hereinafter, the field image signal before one field to the field image signal $F_t$ is indicated as a "field image signal $F_{t-1}$".

The field memory 16 delays the input field image signal $F_{t-1}$ for one field period's worth, and outputs it to the motion vector detection circuit 20, the moving circuit 22 and the motion discontinuity detection circuit 26.

Hereinafter, a field image signal before two fields to the field image signal $F_t$ is referred to a "field image signal $F_{t-2}$".

(Intra-Field Interpolation Circuit 18)

The intra-field interpolation circuit 18 generates a field image signal $F_{t-1}1$ interpolated an image in a line not existing in the input field image signal $F_{t-1}$ (hereinafter, refer to an "interpolation line") by using the pixel in an existing line, and outputs it to the mixture circuit 30 and the motion discontinuity detection circuit 26.

The intra-field interpolation circuit 18 generates a field image signal $F'_{t-1}$ by using an average of the upward and downward lines that an interpolated line of the field image signal $F_{t-1}$ is sandwiched.

(Motion Vector Detection Circuit 20)

The motion vector detection circuit 20 generates a motion vector mv between the field image signals $F_t$ and $F_{t-2}$ having an interval for input two fields period's worth by the block matching method.

Then, the motion vector detection circuit 20 outputs the motion vector mv between the calculated frames to the moving circuit 22.

Further the motion vector detection circuit 20 outputs a block differential value DIF indicating reliability of the generated motion vector mv to the mixture ratio decision circuit 24.

The block differential value DIF indicates the sum total of the differentials in the corresponding pixel data between the blocks of the field image signals $F_t$ and $F_{t-2}$ corresponding to the motion vector mv.

(Moving Circuit 22)

The moving circuit 22 outputs a field image signal $F_{t-1}2$ moved in parallel with the field image signal $F_{t-2}$ which is input from the field memory 16 for a half of the motion vector mv which is input from the motion vector detection circuit 20, namely, for a motion vector corresponding to one field period's worth, to the mixture circuit 30.

Note that, the field image signal $F_{t-1}2$ is set to a signal included in the interpolation line of the field image signal $F_{t-1}$ by the parallel-move.

(Mixture Ratio Decision Circuit 24)

The mixture ratio decision circuit 24 generates a mixture ratio data MIXR1 indicating a mixture ratio of the pixel in the field image signal $F_{t-1}1$ and the field image signal $F_{t-1}2$ which are placed in the same coordinate in the mixture circuit 30 in a range of 0 to N (N≧0) by a block unit based on the block differential value DIF of the motion vector mv which is input from the motion vector detection circuit 20, and outputs it to the mixture circuit 30.

The mixture ratio decision circuit 24 can decide that the reliability of the motion vector mv is higher in proportion as a reduction of the block differential value DIF for example, and makes value indicated by the mixture ratio data MIXR1 reduce in order to increase a ratio mixing the pixel data of the field image signal $F_{t-1}2$.

(Motion Discontinuity Detection Circuit 26)

The motion discontinuity detection circuit 26 decides the motion discontinuity in every pixel data by using the field image signal $F_{t-1}1$ from the intra-field interpolation circuit 18, the field image signal $F_t$ from the input terminal 12 and the field image signal $F_{t-2}$ from the field memory 16, generates a mixture ratio data MIXR2 based on the decided result, and outputs it to the comparison circuit 28.

Figure 7:
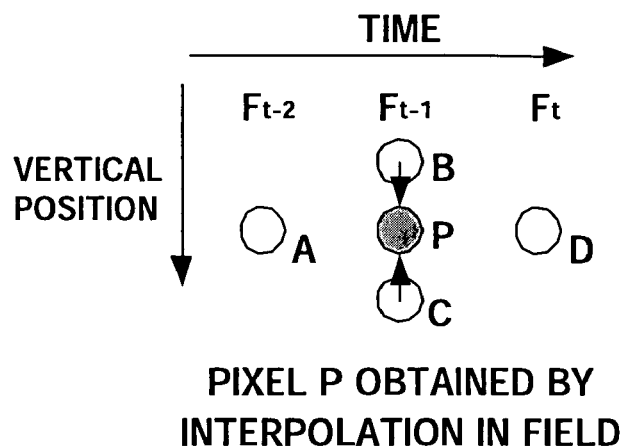
FIG. 7 is a view for illustrating a field interpolation processing in an intra-field interpolation circuit shown in FIG. 6.

The motion discontinuity detection circuit 26 generates a differential absolute value fd1 between the field image signal $F_t$ and the field image signal $F_{t-1}1$ by using the following formula (1) and a differential absolute value fd2 between the field image signal $F_{t-1}1$ and the field image signal $F_{t-2}$ by using the following formula (2), for example as shown in FIG. 7, based on a pixel data d(P) of a pixel position P obtained by a field interpolation in the interpolated field image signal $F_{t-1}1$ which is input from the intra-field interpolation circuit 18, a pixel data d(D) of a corresponding pixel position D in the field image signal $F_t$ which is input from the input terminal 12, and a pixel data d(A) of a corresponding pixel position A in the field image signal $F_{t-2}$ which is input from the field memory 16.

$$fd1 = |d(D)-d(P)| \quad (1)$$

$$fd2 = |d(A)-d(P)| \quad (2)$$

The motion discontinuity detection circuit 26 makes the minimum one of the generated differential absolute values fd1 and fd2 as the minimum differential absolute value fdmin.

$$fd\min = \min(fd1, fd2) \quad (3)$$

Figure 8:
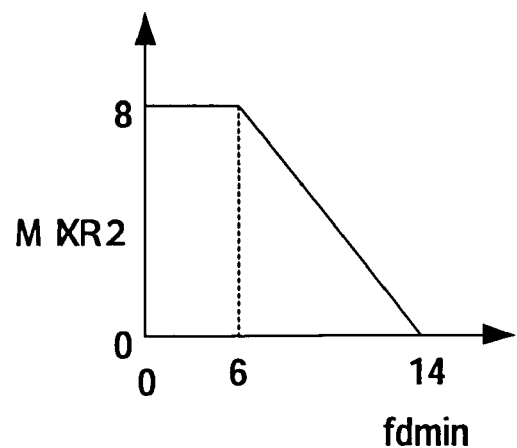
FIG. 8 is a view for illustrating a processing in a motion discontinuity detection circuit shown in FIG. 6.

The motion discontinuity detection circuit 26 generates a mixture ratio data MIXR2 based on the minimum differential absolute value fdmin in accordance with characteristics shown in the following formula (4) and FIG. 8.

In the following formula (4), an "N" is indicated as the maximum value of the mixture ratio data MIXR2, and is same as the maximum value of the mixture ratio data MIXR1.

A "th1" is indicates as a threshold value for detecting a motion between the frames, a "th2" is indicated as a threshold value for deciding motion discontinuity, and a "k" is indicated as a specific threshold value for deciding discontinuity. FIG. 8 shows characteristics in the case of the "n" of 8, the "th2" of 6 and the "k2" of 1.

$$MIXR2 = 0 \text{ if } |d(A)-d(D)| < th1$$

$$MIXR2 = N - (dmin - th2)/k \text{ if } |d(A)-d(D)| \geq th1 \quad (4)$$

(Comparison Circuit 28)

The comparison circuit 28 compares the mixture ratio data MIXR1 which is input from the mixture ratio decision circuit 24 and the mixture ratio data MIXR2 from the motion discontinuity decision circuit 26, selects the larger one, and outputs it as a mixture ratio data MIX to the mixture circuit 30.

(Mixture Circuit 30)

The mixture circuit 30 mixes the field image signal $F_{t-1}1$ which is input from the intra-field interpolation circuit 18 and the field image signal $F_{t-1}2$ which is input from the moving circuit 22 in every corresponding pixel data based on the mixture ratio data MIXR to generate a field image signal $F_{t-1}3$, and outputs it to the double speed conversion circuit 32.

Concretely, the mixture circuit 30 defines a pixel data included in the field image signal $F_{t-1}1$ as a "d(1)", and defines a pixel data included in the field image signal $F_{t-1}2$ corresponding to the d(1) as a "d(2)".

And the mixture circuit 30 generates a pixel data d(3) of the field image signal $F_{t-1}3$ corresponding to the above d(1) in accordance with the following formula (5).

$$d(3) = d(1) \times MIXR/N + d(2) \times (N-MIXR)/N \quad (5)$$

As mentioned above, the mixture circuit 30 mixes the interpolated field image signal $F_{t-1}1$ in high ratio as an increase of a value of the mixture ratio data MIXR.

(Double Speed Conversion Circuit 32)

The double speed conversion circuit 32 alternatively outputs a first line existing in the field image signal $F_{t-1}$ from the field memory 14 and a second line (interpolation line) corresponding to the first line in the field image signal $F_{t-1}3$ from the mixture circuit 30 at twice of the horizontal scan period when inputting the field image signal $F_t$ to generate a frame image signal (successive scan image signal) $H_{t-1}$ included in the progressive signal, and outputs it via the output terminal 34 to the latter circuit.

The image processing device 1 shown in FIG. 6 mixes the field image signal obtained by the intra-field interpolation shown in FIG. 2 and the field image signal obtained based on the motion vector mv to generate the interpolation line of the field image signal $F_{t-1}$. Note that, a method of deciding a mixture ratio differs from the related art of the present invention mentioned above.

Next, an example of an operation of the image processing device 1 shown in FIG. 6 will be described.

First, the interlaced image signal is input to the input terminal 12 and the field image signal $F_t$ included in the interlaced image signal is output to the field memory 14, the motion vector detection circuit 20 and the motion discontinuity detection circuit 26.

The field memory 14 delays the field image signal $F_t$ which is input from the input terminal 12 for one field period's (cycle) worth and outputs it to the intra-field interpolation circuit 18, the field memory 16 and the double speed conversion circuit 32.

The field memory 16 delays the field image signal $F_{t-1}$ which is input from the field memory 14 for one field period's worth, and outputs it to the motion vector detection circuit 20, the moving circuit 22 and the motion discontinuity detection circuit 26.

The moving circuit 22 outputs the field image signal $F_{t-1}2$ moved in parallel with the field image signal $F_{t-2}$ which is input from the field memory 16 for a half of the motion vector mv which is input from the motion vector detection circuit 20, namely, for a motion vector corresponding to one field period's worth, to the mixture circuit 30.

The intra-field interpolation circuit 18 generates the field image signal $F_{t-1}1$ obtained by interpolating a pixel in the line not existing in the field image signal $F_{t-1}$ which is input from the field memory 14 (hereinafter, refer to an "interpolation line") by using a pixel in the existing line, and outputs it to the mixture circuit 30 and the motion discontinuity detection circuit 26.

The motion vector detection circuit 20 generates the motion vectors mv between the field image signal $F_t$ and the field image signal $F_{t-2}$ having an interval for input two field periods's worth by the block matching method, and outputs it to the moving circuit 22.

The motion vector detection circuit 20 outputs the block differential value DIF indicating the reliability of the generated motion vector mv to the mixture ratio decision circuit 24.

Then, the mixture ratio decision circuit 24 generates the mixture ratio data MIXR1 indicating a mixture ratio of the pixels in the field image signal $F_{t-1}1$ and the field image signal $F_{t-1}2$ in the mixture circuit 30 which are placed in the same coordinate in a range of 0 to N (N≧0) by using a block unit based on the block differential value DIF of the motion vector mv which is input from the motion vector decision circuit 20, and outputs it to the mixture circuit 30.

The motion discontinuity detection circuit 26 decides the motion discontinuity in every pixel data by using the field image signal $F_{t-1}1$ from the intra-field interpolation circuit 18, the field image signal $F_t$ from the input terminal 12 and the field image signal $F_{t-2}$ from the field memory 16, generates the mixture ratio data MIXR2 based on the decided result, and outputs it to the comparison circuit 28.

The comparison circuit 28 compares the mixture ratio data MIXR1 which is input from the mixture ratio decision circuit 24 and the mixture ratio data MIXR2 from the motion discontinuity detection circuit 26, selects the larger one, and outputs it as the mixture ratio data MIXR to the mixture circuit 30.

Then, the mixture circuit 30 mixes the field image signal $F_{t-1}1$ which is input from the intra-field interpolation circuit 18 and the field image signal $F_{t-1}2$ which is input from the moving circuit 22 in every corresponding pixel data based on the mixture ratio data MIXR to generate the field image signal $F_{t-1}3$, and outputs it to the double speed conversion circuit 32.

Then, the double speed conversion circuit 32 alternatively outputs the first line existing in the field image signal $F_{t-1}$ from the field memory 14 and the second line (interpolation line) corresponding to the first line in the field image signal $F_{t-1}3$ from the mixture circuit 30 at twice of the horizontal scan period when inputting the field image signal $F_t$ to generate a frame image signal (successive scan image signal) $H_{t-1}$ included in the progressive signal, and outputs it via the output terminal 34 to the latter circuit.

Due to the image processing device 1, when the film image signal or the CG image signal is input as a field image signal $F_t$, since the continuous field image signal has a same signal mentioned by using FIG. 4, the minimum differential absolute value fdmin of the above formula (3) becomes zero. As a result, the mixture ratio data MIXR1 becomes the maximum value of eight, and the mixture circuit 30 outputs the field image signal $F_{t-1}1$ interpolated in the field as the field image signal $F_{t-13}$ to the double speed conversion circuit 32.

Therefore, an image shift as mentioned in FIG. 5 is suppressed, the interpolation image can be obtained in high quality, and the progressive image signal can be generated in high quality by converting the interlaced image signal.

Namely, if the field image signal $F_t$ is set to a signal which is used to movie or television commercial, which is performed with the 2-2 pull-down processing or the 3-2 pull-down processing, and which displays the image of the same time twice or third time repeatedly shown in FIGS. 4A and 4B, the image processing device 1 can generate the progressive image signal in high quality by converting the interlaced image signal free from the image shift as mentioned in FIG. 5.

Figure 9:
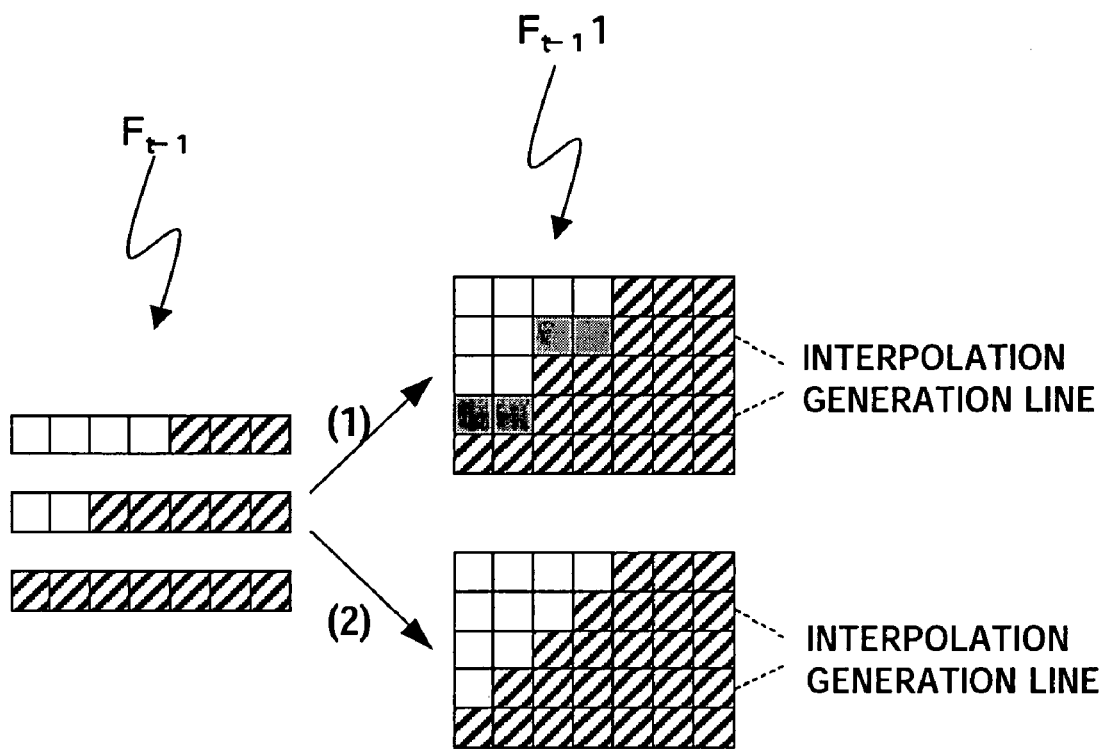
FIG. 9 is a view for illustrating a modification of the processing in an intra-field interpolation circuit shown in FIG. 6.

The first embodiment mentioned above is illustrated with a case of the interpolation (linearly interpolation) by calculating an average by using the upward and downward lines in the intra-field interpolation circuit 18, additionally an interpolation by an oblique interpolation method as shown in FIG. 9 may be able to be applied.

In this case, the intra-field interpolation circuit 18 measures an interrelationship of the pixel in an oblique direction passing though the interpolation pixel between the upward and downward lines of the interpolation pixel, and employs the pixel data having the nearest interrelationship as an interpolation data.

FIG. 9 shows a linear interpolation method (1) and an oblique interpolation method (2).

Note that, the oblique interpolation method (2) shown in FIG. 9 performs the interpolation based on a plurality of the pixel data of the both existing lines, so that it has better interpolation efficiency in the boundary portion of the oblique direction than the linier interpolation method (1).

Figure 10:
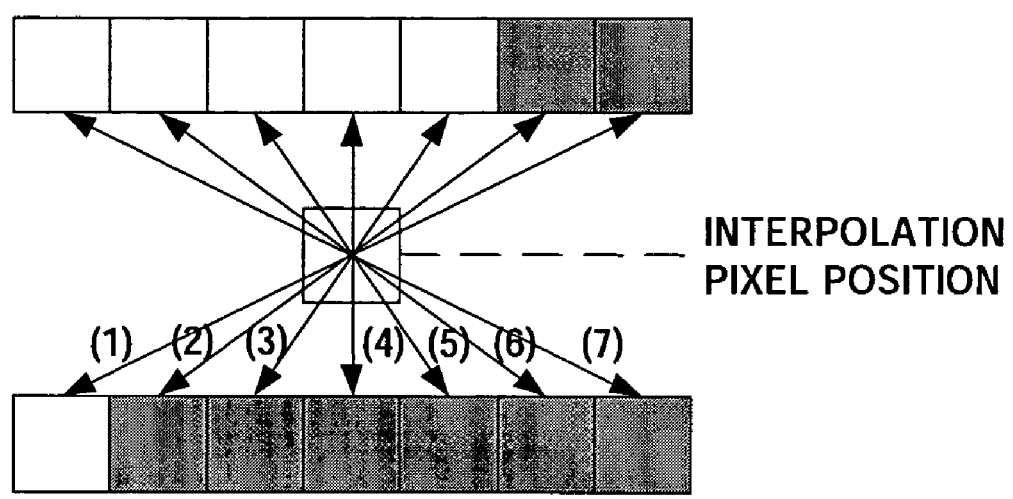
FIG. 10 is a view for illustrating a modification of the processing in the intra-field interpolation circuit shown in FIG. 6.

Namely, the intra-field interpolation circuit 18 employs the oblique interpolation method shown in FIGS. 9 and 10, so that a precision of detecting the discontinuity in the motion discontinuity detection circuit 26 can be improved and an interpolated image can be obtained free from the image shift in the boundary portion of the oblique direction.

Second Embodiment

Figure 11:
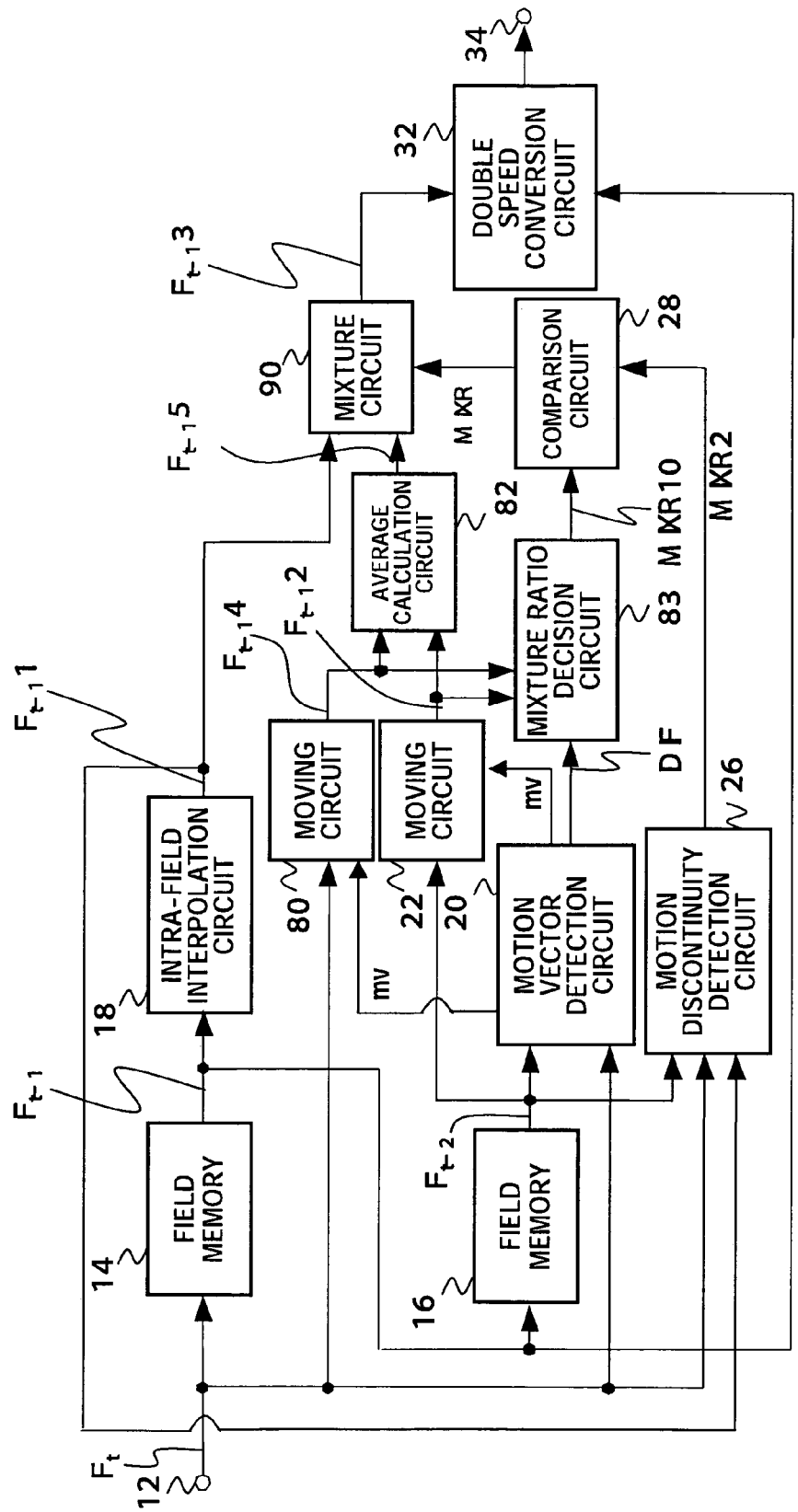
FIG. 11 is a view of a configuration of an image processing circuit according to a second embodiment of the present invention.
Figure 12:
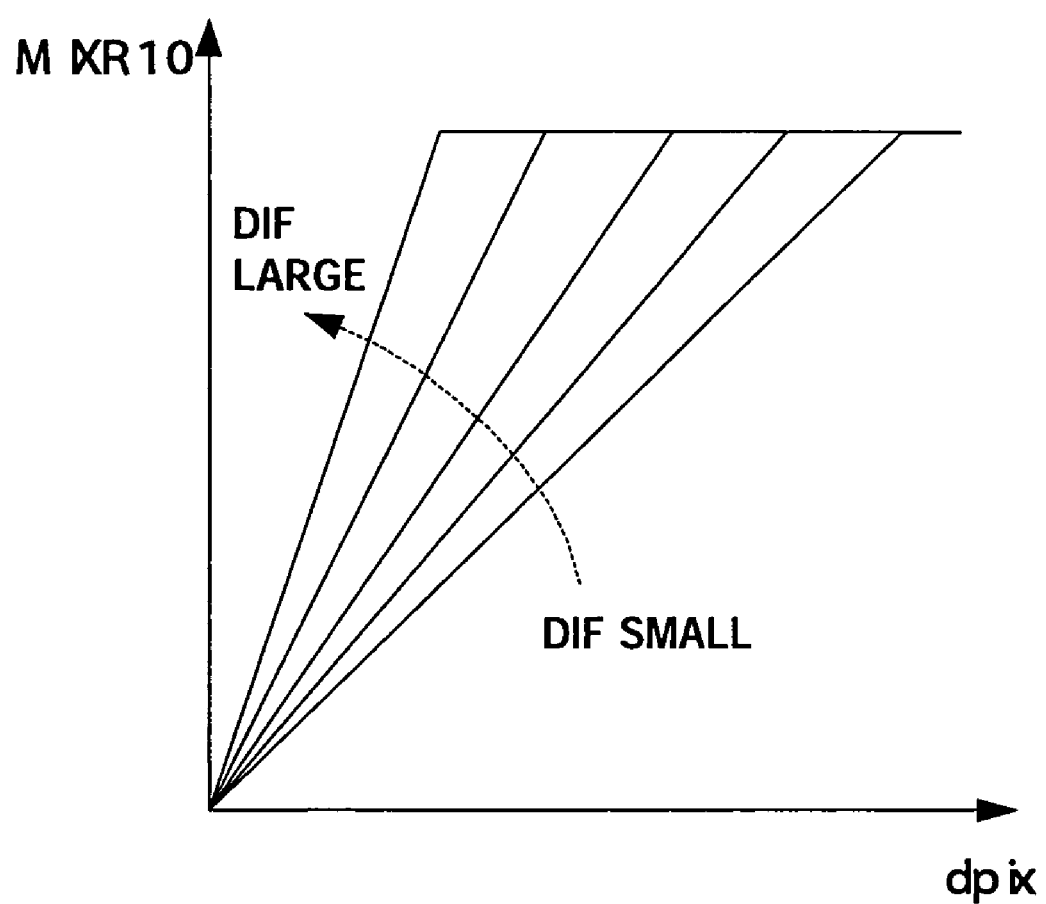
FIG. 12 is a view for illustrating a processing in a mixture ratio decision circuit of the image processing device shown in FIG. 11.

FIG. 11 is a view of a configuration of an image processing device 81 of a second embodiment of the present invention.

As shown in FIG. 11, the image processing device 81 has the input terminal 12, the field memory 14, the field memory 16, the intra-field interpolation circuit 18, the motion vector detection circuit 20, the moving circuit 22, the motion discontinuity detection circuit 26, the comparison circuit 28, the double speed conversion circuit 32, the output terminal 34, a moving circuit 80, an average calculation circuit 82, a mixture ratio decision circuit 83, and a mixture circuit 90, for example.

As shown in FIG. 11, the image processing device 81 includes the image processing device 1 shown in FIG. 6 and additionally the moving circuit 80 and the average value calculation circuit 82.

Further, a processing by the mixture ratio decision circuit 83 and the mixture circuit 90 in the image processing device 81 differs from the processing by the mixture ratio decision circuit 24 and the mixture circuit 30 of the first embodiment shown in FIG. 6.

Next, a configuration of the image processing device 81 will be described with mainly different portion from the image processing device 1 shown in FIG. 6.

In the present embodiment, the moving circuit 22 outputs the field image signal $F_{t-1}2$ to the mixture ratio decision circuit 83 and additionally the average value calculation circuit 82.

(Moving Circuit 80)

The moving circuit 80 makes the field image signal $F_t$ which is input from the input terminal 12 move in parallel for a half of the motion vector which is the reverse direction of the motion vector mv input from the motion vector detection circuit 26, namely, for a reverse direction vector of the motion vector corresponding to one field period's worth, to generate the field image signal $F_{t-1}4$, and outputs it to the mixture ratio decision circuit 83 and the average value calculation circuit 82.

(Average Value Calculation Circuit 82)

The average value calculation circuit 82 calculates an average value of the image data included in the field image signal $F_{t-1}2$ which is input from the moving circuit 22 and the image data of the field image signal $F_{t-1}4$ which is input from the moving circuit 80, generates a field image signal $F_{t-1}5$ that the average is a corresponding pixel data, and outputs it to the mixture circuit 90.

(Mixture Ratio Decision Circuit 83)

The mixture ratio decision circuit 83 generates the differential absolute value dpix of the pixel data included in the field image signal $F_{t-1}2$ which is input from the moving circuit 22 and the image data of the field image signal $F_{t-1}4$ which is input from the moving circuit 80 and which corresponds to the image data.

In the formula (6) in explanation blow, a "$d(f_{t-1}2)$" indicates the pixel data of the field image signal $F_{t-1}2$, and a "$d(F_{t-1}4)$" indicates the pixel data of the field image signal $F_{t-1}4$.

$$dpix = |d(F_{t-1}2) - d(f_{t-1}4)| \qquad (6)$$

The mixture ratio decision circuit 83 decides the mixture ratio based on the generated differential absolute value dpix and the block differential value DIF which is input from the motion discontinuity detection circuit 26, decides a mixture ratio data MIXR10, and outputs it to the comparison circuit 28.

The mixture ratio data MIXR10 has a range of 0 to N.

In the present embodiment, the mixture ratio decision circuit 83 generates the mixture ratio data MIXR so as to raise the mixture ratio data MIXR in accordance with an increase of the differential absolute value dpix, and to increase an inclination for raising the mixture ratio data MIXR in accordance with an increase of the block differential DIF.

(Comparison Circuit 28)

The comparison circuit 28 compares the mixture ratio data MIXR10 which is input from the mixture ratio decision circuit 83 and the mixture ratio data MIXR2 which is input from the motion discontinuity detection circuit 26, selects the larger one, and output it to the mixture circuit 90 as the mixture ratio data MIX.

(Mixture Ratio 90)

The mixture ratio 90 mixes the field image signal $F_{t-1}1$ which is input from the intra-field interpolation circuit 18 and the field image signal $F_{t-1}5$ which is input from the average calculation circuit 82 in the corresponding pixel data based on the mixture ratio data MIXR to generate the field image signal $F_{t-1}3$, and output it to the double speed conversion circuit 32.

Concretely, the mixture circuit 90 defines the pixel data included in the field image signal $F_{t-1}1$ as a d(11), and the image data included in the field image signal $F_{t-1}5$ corresponding to the d(11) as a d(12).

The image data d(5) of the field image signal $F_{t-1}5$ corresponding to the d(11) is generated in accordance with the following formula (7).

$$d(5)=d(11)\times MIXR/N+d(12)\times (N-MIXR)/N \quad (7)$$

As mentioned above, the mixture circuit 90 mixes the interpolated field image signal $F_{t-1}1$ in high ratio in accordance with an increase of the mixture ratio data MIXR.

Next, an example of an operation of the image processing device 81 shown in FIG. 11 will be described.

First, the interlaced image signal is input to the input terminal 12 and the field image signal $F_t$ included in the interlaced image signal is output to the field memory 14, the moving circuit 80, and the motion detection circuit 20 and the motion discontinuity detection circuit 26.

The field memory 14 delays the field image signal $F_t$ which is input from the input terminal 12 for one field period's (cycle) worth, and outputs it to the intra-field interpolation circuit 18, the field memory 16 and the double speed conversion circuit 32.

The field memory 16 delays the field image signal $F_{t-1}$ which is input from the field memory 14 for one field period's worth, and outputs it to the motion vector detection circuit 20, the moving circuit 22 and the motion discontinuity detection circuit 26.

Then, the motion vector detection circuit 20 generates the motion vector mv between the field image signal $F_t$ and the field image signal $F_{t-2}$ having an interval for the input two field period's worth by the block matching method, and outputs it to the moving circuits 22 and 80.

The motion vector detection circuit 20 outputs the block differential value DIF indicating the reliability of the generated motion vector mv to the mixture ratio detection circuit 83.

Then, the moving circuit 22 outputs the field image signal $F_{t-1}2$ to the average calculation circuit 82 and the mixture ratio decision circuit 83, which the field image signal $F_{t-1}2$ is generated by making the field image signal $F_{t-2}$ which is input form the field memory 16 move in parallel for a half of the motion vector which is input from the motion vector detection circuit 20, namely, the motion vector corresponding to one field period's worth.

The moving circuit 80 makes the field image signal $F_t$ which is input from the input terminal 12 move in parallel for a half of the motion vector which is the reverse direction of the motion vector mv which is input from the motion vector detection circuit 26, namely, for the vector in the reverse direction to the motion vector corresponding to one field period's worth, to generate the field image signal $F_{t-1}4$, and outputs it to the mixture ratio decision circuit 83 and the average calculation circuit 82.

The intra-field interpolation circuit 18 generates the field image signal $F_{t-1}1$ obtained by interpolating the pixel in the line not existing in the filed image signal $F_{t-1}$ which is input from the field memory 14 (hereinafter, refer to an "interpolation line") by using the pixel in the existing line, and outputs it to the mixture circuit 90 and the motion discontinuity detection circuit 26.

The mixture ratio decision circuit 83 generates the differential absolute value dpix of the pixel data included in the field image signal $F_{t-1}2$ which is input from the moving circuit 22 and the pixel data of the field image signal $F_{t-1}4$ which is input from the moving circuit 80 and corresponding to the pixel data.

Then, the mixture ratio decision circuit 83 decides the mixture ratio based on the generated differential absolute value dpix and the block differential value DIF which is input from the motion discontinuity circuit 26, decides the mixture ratio data MIXR10, and outputs it to the comparison circuit 28.

The motion discontinuity detection circuit 26 detects the motion discontinuity in the respective pixel data by the field image signal $F_{t-1}1$ from the intra-field interpolation circuit 18, the field image signal $F_t$ from the input terminal 12, and the field image signal $F_{t-2}$ from the field memory 16, generates the mixture ratio data MIXR based on the decided result, and outputs it to the comparison circuit 28.

The comparison circuit 28 compares the mixture ratio data MIXR10 which is input from the mixture ratio decision circuit 83 and the mixture ratio data MIXR2 from the motion discontinuity detection circuit 26, selects the large one, and outputs it as the mixture ratio data MIXR to the mixture circuit 90.

Then, the mixture circuit 90 mixes the field image signal $F_{t-1}1$ which is input from the intra-field interpolation circuit 18 and the field image signal $F_{t-1}5$ which is input from the average calculation circuit 82 in the respective corresponding pixel data based on the mixture ratio data MIXR to generate the field image signal $F_{t-1}3$, and outputs it to the double speed conversion circuit 32.

The double speed conversion circuit 32 alternatively outputs the first line in the field image signal $F_{t-1}$ from the field memory 14 and the second field line (an interpolation line) corresponding to the first line in the field image signal $F_{t-1}3$ from the mixture circuit 90 at twice of the horizontal scan period when inputting the field image signal $F_t$ to generate the frame image signal (successive scan image signal) $H_{t-1}$ included in the progressive signal by, and outputs it via the output terminal 34 to the latter circuit.

The image processing device 81 shown in FIG. 11 mixes the field image signal obtained by the interpolation in the field and the field image signal obtained based on the motion vector mv to generate the interpolation line of the field image signal $F_{t-1}$ similarly to the first embodiment.

Figure 13:
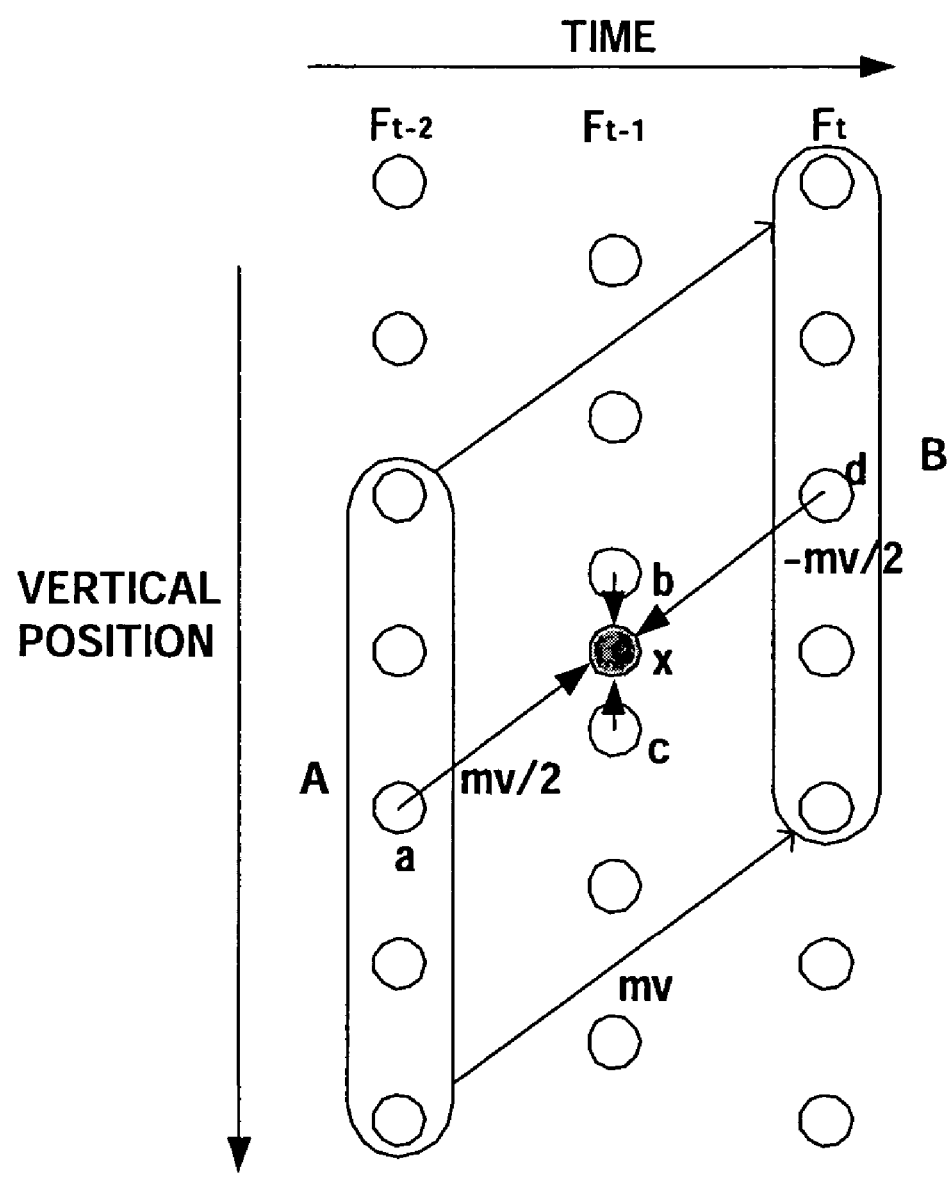
FIG. 13 is a view for illustrating a general processing of the image processing device shown in FIG. 11.

FIG. 13 shows a process of the image processing device 81 shown in FIG. 11.

In the image processing device 81 based on the motion vector mv generated by the motion vector detection circuit 20, the moving circuit 22, the moving circuit 80 and the average calculation circuit 82 generate the field image signal $F_{t-1}2$ and the field image signal $F_{t-1}4$ by interpolating pixels based on the respective motion vector mv/2 and −mv/2.

The mixture ratio decision circuit 83 calculates the average (a+d)/2 of a pixel value of the pixel a in the field image signal $F_{t-1}$ and a pixel value of the pixel b in the field image signal $F_t$, and generates the mixture ratio data MIXR10 based on the average and the block differential DIF indicating |a-d| from the motion discontinuity detection circuit 26.

The mixture circuit 90 uses the field image signal $F_{t-1}5$ which averages the field image signal $F_{t-1}2$ and the field image signal $F_{t-1}4$ as a subject to be selected.

Due to this, failure caused by errors of the motion vector detection becomes decrease. And the differential absolute value dpix in the respective pixels are used to the decision of the reliability of the motion vector, so that it is able to decide the reliability of the motion vector in the respective pixels if the block has a plurality of the motion vector. As a result, it can obtain an interpolation image having lower failure than the first embodiment.

Note that, the present invention can apply the interpolation method in the intra-field interpolation circuit 18 mentioned in the first embodiment by using FIGS. 9 and 10.

The present invention can be applied with a system converting the interlaced image signal and the progressive circuit.

It should be understood by those skilled in the art that various modifications, combinations, sub-combinations and alterations may occur depending on design requirements and other factors in so far as they are within scope of the appeared claims or the equivalents thereof.

What is claimed is:

1. An image processing device converting an interlaced image signal included in a moving image signal to a progressive image signal, said image processing device comprising:

a continuity detection circuit detecting continuities of a field image signal to be processed in the interlaced image signal and field image signals before and behind one field to the field image signal to be processed based on these three field image signals;

a moving circuit moving at least one of the field image signals before and behind one field for one field period's worth based on a motion vector between the field image signals before and behind one field to generate a first field image signal included in a line not existing in the field image signal to be processed; and an image signal generation circuit deciding a mixture ratio based on the continuity detected by said continuity detection circuit, and mixing the first field image signal generated by said moving circuit and a second field image signal obtained by interpolating the line not existing in the field image signal to be processed based on a line in the field image signal to be processed at the mixture ratio to generate a third field image signal included in the progressive signal.

2. An image processing device as set forth in claim 1, further comprising a frame generation circuit generating a frame image signal included in the progressive signal based on the field image signal to be processed and the third field image signal generated by said image signal generation circuit.

3. An image processing device as set forth in claim 1, wherein:

said continuity detection circuit detects discontinuities when at least one of a first differential of the field image signal to be processed and the field image signal before one field to the field image signal to be processed and a second differential of the field image signal to be processed and the field image signal behind one field to the field image signal to be processed is under the predetermined reference, and said image signal generation circuit decides the mixture ratio so as to mix the second field image signal at higher ratio than in detecting continuity when said continuity detection circuit detects discontinuity.

4. An image processing device as set forth in claim 3, wherein image signal generation circuit decides the mixture ratio so as to mix the first field image signal generated by said moving circuit at higher ratio than the second field image signal in accordance with an increase of the smaller value of the first differential and the second differential when said continuity detection circuit detects continuity.

5. An image processing device as set forth in claim 1, further comprising a motion vector detection circuit generating the motion vector and generating a differential of an estimate image signal defined by the motion vector and the field image signals before and behind one field to the field image signal to be processed which becomes a target to be generated of the motion vector, wherein said image signal generation circuit decides the mixture ratio based on the differential generated by said motion vector detection circuit.

6. An image processing device as set forth in claim 5, wherein said image signal generation circuit decides the mixture ratio so as to increase a ratio mixing the first field image signal generated by said moving circuit in accordance with a decrease of the differential generated by said motion vector detection circuit.

7. An image processing device as set forth in claim 1, further comprising an intra-field interpolation circuit generating the second field image signal based on the field image signal to be processed obtained by interpolating the line not existing in the field image signal to be processed based on the line existing in the field image signal to be processed.

8. An image processing device as set forth in claim 1, wherein:

said moving circuit moves the field image signal before one field for one field period's worth to generate a fourth field image signal including the line not existing line in the field image signal to be processed and moves the field image signal behind one field for one field period's worth to generate a fifth field image signal including the line not existing in the field image signal to be processed based on the motion vector between the field image signal to be processed, and said image signal generation circuit decides the mixture ratio by using a differential of the fourth image signal and the fifth field image signal which are generated by said moving circuit.

9. An image processing device as set forth in claim 8, further comprising an average calculation circuit averages the fourth field image signal and the fifth field image signal generated by said moving circuit to generate a sixth field image signal, wherein said image signal generation circuit mixes the second field image signal and the sixth field image signal generated by said average calculation circuit at the mixture ratio to generate a field image signal included in the progressive signal.

10. An image processing method converting an interlaced image signal included in a moving image signal to a progressive image signal, said image processing method comprising:
- a first step of detecting continuity of a field image signal to be processed in the interlaced image signal and field image signals before and behind one field to the field image signal to be processed based on these three field image signals;
- a second step of moving at least one of the field image signals before and behind one field to the field image signal to be processed for one field period's worth to generate a first field image signal including a line not existing in the field image signal to be processed based on a motion vector between the field image signals before and behind one field;
- a third step of deciding a mixture ratio based on the continuity detected in said first step; and
- a fourth step of mixing the first field image signal generated in said second step and the second field image signal obtained by interpolating the line not existing in the field image signal to be processed based on a line in the field image signal to be processed at the mixture ratio decided in said third step to generate a third field image signal included in the progressive signal.

* * * * *